United States Patent Office 3,663,655
Patented May 16, 1972

3,663,655
POLYMERISATION PROCESS
Alan Charles Sturt, Guildford, England, assignor to
BP Chemicals Limited
No Drawing. Filed May 14, 1970, Ser. No. 37,306
Claims priority, application Great Britain, May 19, 1969,
25,418/69
Int. Cl. C08f 1/11
U.S. Cl. 260—875                                5 Claims

ABSTRACT OF THE DISCLOSURE

Process comprising mixing a non-film forming polymer in latex form with a monomer, destroying the latex emulsifying agent so that the latex polymer particles pass into the monomer without substantial change in size and polymerising the monomer, preferably under suspension conditions.

---

The present invention relates to polymer compositions and particularly to a process for the production of such compositions by polymerising monomeric material containing preformed polymeric material.

It is known that useful polymer compositions are obtained by distributing one polymeric material as finely divided particles throughout a second polymeric material which may be in the form of a continuous phase or may be particulate.

Such compositions have been prepared by various techniques. For example the two polymeric materials can be physically blended. Such a process is expensive and it is difficult to ensure adequate mixing and to control the particle sizes of the components of the mixture to obtain optimum properties.

An object of the present invention is to provide an improved technique for the production of polymer compositions.

According to the present invention the process for the preparation of a polymer composition comprises mixing a polymeric material having a glass transition temperature above 20° C. in the form of an aqueous latex stabilised by means of a destructible emulsifying agent with monomeric material consisting essentially of a mono-ethylenically unsaturated aromatic compound, a lower alkyl ($C_1$ to $C_6$) ester of an unsaturated acid, a vinyl ester of a saturated lower organic acid ($C_1$ to $C_6$), acrylonitrile or methacrylonitrile, and in which the polymeric material does not dissolve, destroying the emulsifying agent without substantially altering the size of the first polymeric material particles, allowing these particles to pass into the monomeric phase and polymerising the monomeric material with said particles dispersed therein.

Polymeric material having a glass transition temperature below 20 should not be used in the process of the present invention because the particles thereof have a greater tendency to coagulate irreversibly when the emulsifying agent is destroyed so changing the size of the particles of the polymeric material ultimately present in the final composition.

The polymeric material must be in the form of a stable aqueous latex, i.e. it is distributed throughout a continuous aqueous phase as finely divided particles which are stabilised and therefore do not coalesce or settle out because of the presence in the aqueous phase of an emulsifying agent. Aqueous latices of polymeric materials are well known and are usually prepared by the well known emulsion polymerisation technique. Any polymeric material that has a sufficiently high glass transition temperature (TG) and that can be prepared as or converted into a stable aqueous latex can be used in a process according to the present invention. Examples of such polymeric materials are certain addition polymers and copolymers from monomeric materials such as ethylene, propylene, styrene, acrylonitrile, alkyl methacrylates, e.g. methyl methacrylate and vinyl esters, e.g. vinyl acetate and vinyl chloride. The polymeric material can consist of a copolymer of one of the above monomeric materials and a comonomer which does not give a homopolymer having a TG greater than 20° C., provided that the copolymer has the required TG. Examples of such comonomers are butadiene, isoprene, chloroprene, and ethylacrylate.

The polymeric material is stabilised by means of a destructible emulsifying agent. The agent has to be destructible, i.e. convertible to an ineffective form, so that it does not interfere with the operation of the second stage of the process. The preferred destructible emulsifying agents are carboxylic acid salts which are not emulsifying agents when in the free acid form. They may be represented by the formula R·COOX where R is a large organic radical attached to the carboxyl salt group COOX. When a relatively strong acid (HA) i.e. an acid that is stronger than the acid from which the emulsifying agent is obtained, is added to the emulsifying agent the following reaction occurs:

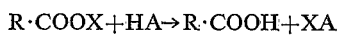

The free acid R·COOH is not an emulsifying agent and thus acidification destroys the carboxylic acid salt type emulsifying agents. In this system the pH of the system can be reduced gradually and this gives a controlled hydrolysis of the emulsifier. This ability for gradual diminution of the emulsifying power of the agent is of value in ensuring that the size of the polymeric material particles is not substantially altered during their passage into the monomeric phase according to the process of the present invention. Examples of suitable carboxylic acid salt emulsifying agents are the carboxylic acid soaps and rosin acid salts, e.g. alkali metal or ammonium salts of disproportionated rosin acids, oleic acid, lauric acid, stearic acid, palmitic acid and myristic acid.

Another class of destructible emulsifying agent consists of the alkali or ammonium metal salts of complex organic phosphate esters. Examples of such agents are sold under the trade names Gafac PE 510 and RE 610 and are made by General Aniline Company. These emulsifying agents are destroyed by adding to the aqueous phase a solution of a material which causes precipitation of the agent. For example if a soluble calcium salt is added to the aqueous phase the agent is destroyed and formed into an insoluble calcium salt.

Many other types of emulsifying agent can be regarded as destructible according to the present invention if they can be rendered ineffective as emulsifying agents during the second stage of the process. For example, the alkyl sulphate type emulsifying agents can be rendered ineffective by the addition of heavy metal salts to the system.

The monomeric material is selected from the group consisting essentially of a mono-ethylenically unsaturated aromatic compound, a lower alkyl ester of an unsaturated acid, a vinyl ester of a saturated lower organic acid, acrylonitrile, methacrylonitrile or mixtures thereof. However, the monomeric material may contain a minor proportion by weight of other monomers that are copolymerisable with the essential compounds named above. When the monomeric material is to be polymerised under suspension polymerisation conditions it is of course necessary to choose monomeric material that can be so polymerised. Generally it is found that polymers and copolymers having a glass transition temperature above 20° C. can be formed by suspension polymerisation. Examples of monomeric material that can be used are acrylonitrile; styrene; vinyl acetate; acrylate and methacrylate esters, e.g. methyl methacrylate; fumarate and maleate esters; and mixtures thereof.

The aqueous latex and the monomeric material are suitably mixed together while the emulsifying agent is destroyed. It is found that, if the two phases are well mixed together and the emulsifying agent destroyed in such a way that the coagulation of the polymeric material particles does not occur, these particles pass into the organic phase without substantial change in size. A protective colloid may be present in the system while the emulsifying agent is destroyed in order to assist the passage of the first polymeric material particles into the monomeric phase without substantial alteration of their size. The protective colloids used in this way act at the interface of the monomeric material and the polymeric material and therefore are of the organic type. Examples are polyvinyl alcohols and cellulose ethers.

It will be appreciated that the polymeric particles may absorb the monomeric material and thus expand in size during the process of the present invention. Such an expansion is not regarded as a substantial alteration in size whereas coagulation in which many particles coalesce to form large macro-sized polymer particles in which the original latex particles have lost their individual identity, is.

The polymerisation of the monomeric material may be brought about by any convenient means. For example, the monomeric material containing the dispersed particles may be separated from the aqueous phase and then polymerised by known mass polymerisation techniques. Most suitably, however, the monomeric material is subjected to known suspension polymerisation procedures in the presence of the aqueous phase of the first polymeric material latex. The fact that the emulsifying agent is destroyed means that its concentration in the aqueous phase is low enough not to give rise to emulsion polymerisation and thus there should be no loss of monomeric material in the aqueous phase as emulsified material.

The polymerisation may be initiated before or after the destruction of the emulsifying agent, but it is preferred that the destruction is completed before polymerisation commences and thus the chance of the formation of unwanted emulsion polymer is reduced.

If the polymerisation is to be effected under suspension polymerisation conditions any of the known suspension stabiliser systems appropriate to the monomeric material may be employed. Such suspension stabiliser systems can contain suspending agents of the organic or inorganic type and can be water soluble or insoluble. Examples of suitable organic suspending agents are polyvinyl alcohol, partially hydrolysed polyvinylacetates, salts of styrene-maleic anhydride copolymers, gelatin, cellulose ethers such as methyl cellulose, hydroxypropyl methyl cellulose and hydroxyethyl cellulose. Examples of suitable inorganic suspending agents are sparingly soluble metal phosphates such as hydroxy apatite. Mixtures of organic and inorganic suspending agents and of water soluble and insoluble suspending agents can be used. If the suspending agent employed is conventional, for example a water soluble organic agent such as hydroxypropyl methyl cellulose (trade name Methocell 65 HG 50) it is suitably present in an amount in the range 0.02–1.0% by weight of the monomeric material employed and an inorganic suspending agent such as hydroxy apatite is suitably present in an amount in the range 0.05–1.0% by weight of the monomeric material employed.

The suspending agent or the suspension stabiliser system can be added either before or after the destruction of the emulsifying agent.

The efficiency of the suspension stabiliser can be increased by the well known technique of including buffers and/or wetting agents in the system. It is important that the amount of wetting agent should not be so great as to cause emulsification of the monomeric materials. Examples of suitable wetting agents include anionic surface active agents such as sodium caproate and sodium oleate, organic sulphates and sulphonates such as long chain alkyl sulphates and sulphonates, alkyl aromatic sulphonates, arylalkyl polyether sulphonates and sodium salts of alkyl phosphates.

After the emulsifying agent has been destroyed in the sense that it is no longer present in sufficient quantity to give rise to emulsion polymerisation, there may still be a sufficient quantity of the agent present to increase the efficiency of any suspending agent employed in the final polymerisation.

Conventional components of polymerisation systems can be present in the polymerisation step of the present invention, e.g. polymerisation initiator systems, molecular weight modifiers and the like. These are chosen according to the requirements of the monomeric material being polymerised. Similarly if suspension polymerisation conditions are to be employed conventional phase ratios of organic to aqueous phases can be employed.

The process of the present invention can be widely applied for the incorporation of any polymeric material that has a glass transition temperature greater than 20° C. and can be formed into a stable latex, into a second polymeric material that can be formed by mass or suspension polymerisation procedures. It is particularly valuable for the preparation of polymer compositions in which one polymeric material is dispersed throughout a continuous phase of a second polymeric material. The physical properties of such a composition often depend on the nature and size of the dispersed polymer particles. By control of the emulsion polymerisation process by which the first polymeric material latex is formed by known means, the size of the latex particles can be adjusted and thus the size of the dispersed polymer particles in the final product can be controlled. For many compositions the best properties are obtained when the dispersed polymeric material has an average particle size below 10 microns, preferably between 0.05 and 5 microns. Such particle sizes are readily obtained by emulsion polymerisation procedures. Similarly the nature of the first polymeric material can be easily adjusted by selection of the monomeric materials present in the emulsion polymerisation system in which it is formed and by after treatment of the latex.

It will be readily appreciated that the quantity of first polymeric material that can be introduced into the monomeric material is limited by the need to obtain a polymer in monomer suspension system that can be subsequently polymerised. Generally the polymeric material originally present in aqueous latex form does not constitute more than 50% by weight of final product.

The following examples illustrate the process of the present invention. The parts by weight (p.b.w.) bear the same relationship to the parts by volume (p.b.v.) as do grams to millilitres.

EXAMPLE 1

The following ingredients were employed:

(1) A styrene/acrylonitrile copolymer latex—solids content, 43.9%—emulsifying agent, a rosin acid salt: 102.5 p.b.w.
(2) Distilled water: 170 p.b.w.
(3) 1% aqueous solution of hydroxy ethyl cellulose: 72 p.b.v.
(4) Styrene: 127.5 p.b.w.
  Methyl methacrylate: 127.5 p.b.w.
  Benzoyl peroxide (70%): 3.6 p.b.w.

(5) Aqueous acetic acid (10% w./v.): 2.5 p.b.v.
(6) 4% aqueous solution of a medium viscosity, 88% hydrolysed polyvinyl acetate: 12.7 p.b.v.
Distilled water: 287 p.b.w.
Polymerisation temperature: 80° C.
pH of filtrate: 4.5

The latex (1), water (2) and protective colloid (3) were charged to a reactor and stirred for five minutes. Nitrogen was allowed to pass slowly through the reactor as a purging process. The monomeric material and initiator (4) were added slowly over five minutes and the system stirred for five minutes. The acetic acid (5) and suspending agent solution (6) were separately added during five minutes, and stirring continued for five minutes before the contents of the reactor were heated to the polymerisation temperature and maintained at that temperature until polymerisation is complete. The addition of the acetic acid destroyed the effectiveness of the emulsifying agent and the latex polymer particles passed into the monomeric material without substantial alteration of particle size. The polymerisation was effected under suspension conditions. The product was obtained as large beads having the following sieve analysis:

| Mesh No.: | Percent retained |
|---|---|
| 4 | 98.2 |
| 10 | 1.4 |

EXAMPLE 2

The process of Example 1 was repeated but using the following ingredients and conditions:

(1) An acrylonitrile/polybutadiene/styrene (ABS) copolymer latex—solids content, 28.4%—emulsifying agent, a rosin acid salt: 158.4 p.b.w.
(2) Distilled water: 106 p.b.w.
(3) 1% aqueous solution of hydroxy ethyl cellulose: 72 p.b.v.
(4) Styrene: 166 p.b.w.
Acrylonitrile: 89 p.b.w.
Benzoyl peroxide (70%): 3.6 p.b.w.
(5) Aqueous acetic acid (10% w./v.): 18.2 p.b.v.
(6) 4% solution of a medium viscosity, 88% hydrolysed polyvinyl acetate: 32 p.b.v.
Distilled water: 268 p.b.w.
Polymerisation temperature: 80° C.

The product was obtained as beads having the following sieve analysis:

| Mesh No.: | Percent retained |
|---|---|
| 4 | 10.3 |
| 10 | 30.6 |
| 14 | 33.1 |
| 30 | 24.0 |
| 44 | 1.1 |
| 60 | 0.6 |
| 150 | 0.2 |
| 200 | Trace |
| >200 | Trace |

EXAMPLE 3

The process of Example 1 was repeated but using the following ingredients and conditions:

(1) An acrylonitrile/polybutadiene/styrene (ABS) copolymer latex—solids content, 28.4%—emulsifying agent, a rosin acid salt: 158.4 p.b.w.
(2) Distilled water: 106 p.b.w.
(3) 1% aqueous solution of hydroxy ethyl cellulose: 72 p.b.v.
Methyl methacrylate: 255 p.b.w.
(4) Benzoyl peroxide (70%): 3.6 p.b.w.
(5) Acetic acid (10% w./v.): 18.2 p.b.v.
(6) 4% aqueous solution of a medium viscosity, 88% hydrolysed polyvinyl acetate: 32 p.b.v.
Distilled water: 268 p.b.w.
Polymerisation temperature: 80° C.

The product was obtained as beads having the following sieve analysis:

| Mesh No.: | Percent retained |
|---|---|
| 4 | 6.7 |
| 10 | 7.0 |
| 14 | 7.3 |
| 30 | 35.5 |
| 44 | 18.9 |
| 60 | 10.8 |
| 150 | 5.3 |
| 200 | 4.4 |
| >200 | 3.9 |

EXAMPLE 4

The process of Example 1 was repeated but using the following ingredients and conditions:

(1) A polyvinyl chloride latex—solids content, 33.2%—emulsifying agent, ammonium stearate: 135.4 p.b.w.
(2) Distilled water: 96 p.b.w.
(3) 1% aqueous solution of hydroxy ethyl cellulose: 72 p.b.v.
Styrene: 166 p.b.w.
(4) Acrylonitrile: 89 p.b.w.
Benzoyl peroxide (100%): 2.25 p.b.w.
(5) Acetic acid: 42.6 p.b.v.
(6) 4% solution of a medium viscosity, 88% hydrolysed polyvinyl acetate: 32 p.b.v.
Distilled water: 268 p.b.w.
Polymerisation temperature: 80° C.
pH of filtrate: 6.0.
T.S. of filtrate: 1.4%.

The product was obtained as beads having the following sieve analysis:

| Mesh No.: | Percent retained |
|---|---|
| 4 | 1.1 |
| 10 | 0.7 |
| 14 | 5.8 |
| 30 | 86.3 |
| 44 | 3.9 |
| 60 | 1.2 |
| 150 | 0.2 |
| 200 | 0.7 |
| >200 | Trace |

EXAMPLE 5

The process of Example 1 was repeated but using the following ingredients and conditions:

(1) A polyvinyl chloride latex—solids content, 33.2%—emulsifying agent, ammonium stearate: 135.4 p.b.w.
(2) Distilled water: 96 p.b.w.
(3) 1% aqueous solution of hydroxy ethyl cellulose: 72 p.b.v.
Styrene: 127.5 p.b.w.
(4) Methyl methacrylate: 127.5 p.b.w.
Benzoyl peroxide (100%): 2.25 p.b.w.
(5) Acetic acid (1% aqueous solution): 42.6 p.b.v.
(6) 4% solution of a medium viscosity, 88% hydrolysed polyvinyl acetate: 32 p.b.v.
Distilled water: 268 p.b.w.
Polymerisation temperature: 80° C.

The product was obtained as beads having the following sieve analysis:

| Mesh No.: | Percent retained |
|---|---|
| 4 | 2.5 |
| 10 | 3.7 |
| 14 | 6.0 |
| 30 | 61.6 |
| 44 | 17.4 |
| 60 | 5.8 |
| 150 | 0.9 |
| 200 | 1.4 |
| >200 | 0.6 |

EXAMPLE 6

The process of Example 1 was repeated but using the following ingredients and conditions. Note that the emulsifying agent was rendered ineffective by the addition of the calcium chloride solution:

(1) A polystyrene latex—solids content 22.1%—emulsifying agent, a rosin acid salt: 203.6 p.b.w.
(2) Distilled water: 62 p.b.w.
(3) 1% aqueous solution of hydroxy ethyl cellulose: 72 p.b.v.
(4) Styrene: 127.5 p.b.w.
  Methyl methacrylate: 127.5 p.b.w.
  Benzoyl peroxide (100%): 2.25 p.b.w.
(5) Aqueous calcium chloride solution (10% w./v. of $CaCl_2.2H_2O$): 10 p.b.v.
(6) 4% solution of a medium viscosity, 88% hydrolysed polyvinyl acetate: 32 p.b.v.
  Distilled water: 268 p.b.w.
  Polymerisation temperature: 80° C.

The product was obtained as beads having the following sieve analysis:

| Mesh No.: | Percent retained |
|---|---|
| 4 | 13.3 |
| 10 | 5.3 |
| 14 | 19.8 |
| 30 | 59.1 |
| 44 | 1.0 |
| 60 | 0.8 |
| 150 | 0.4 |
| 200 | 0.2 |
| >200 | Trace |

EXAMPLE 7

The following ingredients were employed:

(1) An acrylonitrile/polybutadiene/styrene (ABS) copolymer latex—solids content, 28.4%—emulsifying agent, a rosin acid salt: 264 p.b.w.
(2) Distilled water: 224 p.b.w.
(3) 4% aqueous solution of hydroxy ethyl cellulose: 75 p.b.v.
(4) Styrene: 146 p.b.w.
  Acrylonitrile: 79 p.b.w.
  Benzoyl peroxide (70%): 3.2 p.b.w.
(5) Aqueous acetic acid (10% w./v.): 7.6 p.b.v.
  Polymerisation temperature: 85° C.

The latex (1), the water (2) and the suspending agent (3) were charged to a reactor and stirred for five minutes. The monomeric material/catalyst mixture (4) was then added slowly to the stirred mixture over a period of five minutes and was followed by the slow addition of the acid (5) to the stirred mixture over a further period of five minutes. Nitrogen was then bubbled through the stirred reaction mixture while its temperature was slowly raised to the polymerisation temperature. It was maintained at this temperature until polymerisation was substantially complete. The addition of the acetic acid destroyed the effectiveness of the emulsifying agent and the latex polymer particles passed into the monomeric material without substantial alteration of particle size. The polymerisation was effected under suspension conditions although some crusting occurred due to inadequate stirring. The isolated product had the following sieve analysis:

| Mesh No. | Percent retained | Mesh No. | Percent retained | Mesh No. | Percent retained |
|---|---|---|---|---|---|
| 4 | 18.8 | 30 | 39.4 | 150 | 1.4 |
| 10 | 5.1 | 44 | 19.2 | 200 | 2.4 |
| 14 | 4.5 | 60 | 8.5 | >200 | 0.3 |

EXAMPLE 8

The process of Example 7 was repeated using the following ingredients:

(1) An acrylonitrile/polybutadiene/styrene (ABS) copolymer latex—solids content, 28.4%—emulsifying agent, a rosin acid salt: 264 p.b.w.
(2) Distilled wate: 224 p.b.w.
(3) 4% aqueous solution of hydroxy ethyl cellulose: 75 p.b.v.
(4) Methyl methacrylate: 225 p.b.w.
  Benzoyl peroxide (70%): 3.2 p.b.w.
(5) Aqueous acetic acid (10% w./v.): 7.6 p.b.v.
  Polymerisation temperature: 85° C.

The product was mainly obtained in bead form although some crusting and coagulation occurred due to inadequate stirring of the reaction mixture.

EXAMPLE 9

The process of Example 7 was repeated using the following ingredients:

(1) An acrylonitrile/polybutadiene/styrene (ABS) copolymer latex—solids content, 28.4%—emulsifying agent, a rosin acid salt: 105.7 p.b.w.
(2) Distilled water: 328 p.b.w.
(3) 0.5% aqueous solution of a medium viscosity, 88% hydrolysed polyvinyl acetate: 300 p.b.v.
  Styrene: 175 p.b.w.
(4) Acrylonitrile: 9.5 p.b.w.
  Benzoyl peroxide (70%): 3.9 p.b.w.
(5) Aqueous acetic acid (10% w./v.): 1.2 p.b.v.
  Polymerisation temperature: 80° C.

The product was obtained in the form of beads having the following sieve analysis:

| Mesh No.: | Percent retained |
|---|---|
| 4 | 3.9 |
| 10 | 2.7 |
| 14 | 5.1 |
| 30 | 76.1 |
| 44 | 9.5 |
| 60 | 2.5 |
| 150 | 0.1 |
| 200 | Trace |
| >200 | Trace |

EXAMPLE 10

The process of Example 7 was repeated using the following ingredients:

(1) An acrylonitrile/polybutadiene/styrene (ABS) copolymer latex—solids content, 28.4%—emulsifying agent, a rosin acid salt: 264 p.b.w.
(2) Distilled water: 108 p.b.w.
(3) A 1% aqueous solution of a medium viscosity, 88% hydrolysed polyvinyl acetate: 300 p.b.v.
  Styrene: 146 p.b.w.
(4) Acrylonitrile: 79 p.b.w.
  Benzoyl peroxide (70%): 3.2 p.b.w.
(5) Aqueous acetic acid (10% w./v.): 3.0 p.b.v.
  Polymerisation temperature: 80° C.

The product was a fine fibrous material having the following sieve analysis:

| Mesh No.: | Percent retained |
|---|---|
| 4 | 7.5 |
| 10 | 2.1 |
| 14 | 2.5 |
| 30 | 50.8 |
| 44 | 24.3 |
| 60 | 8.9 |
| 150 | 3.3 |
| 200 | 0.5 |
| >200 | Trace |

EXAMPLE 11

The process of Example 7 was repeated using the following ingredients. Note that the emulsifying agent was rendered ineffective by the addition of the calcium chloride solution:

(1) A polymethyl methacrylate latex—solids content, 27.7%—emulsifying agent, sodium lauryl sulphate: 303.5 p.b.w.
(2) Distilled water: 52 p.b.w.
(3) 0.5% aqueous solution of a medium viscosity, 88% hydrolysed polyvinyl acetate: 300 p.b.v.
(4) Styrene: 225 p.b.w.
 Benzoyl peroxide (70%): 3.2 p.b.w.
(5) Aqueous calcium chloride solution (10% w./v.): 20 p.b.v.
 Polymerisation temperature: 85° C.

The product was obtained as beads having the following sieve analysis:

| Mesh No.: | Percent retained |
|---|---|
| 4 | 7.4 |
| 10 | 4.9 |
| 14 | 5.8 |
| 30 | 34.7 |
| 44 | 28.3 |
| 60 | 11.8 |
| 150 | 3.7 |
| 200 | 1.7 |
| >200 | 1.6 |

EXAMPLE 12

The process of Example 11 was repeated using the following ingredients:

(1) Styrene/acrylonitrile copolymer latex—solids content, 25.6%—emulsifying agent, sodium lauryl sulphate: 293 p.b.w.
(2) Distilled water: 287 p.b.w.
(3) 4% aqueous solution of hydroxyethyl cellulose: 75 p.b.v.
(4) Methyl methacrylate: 225 p.b.w.
 Benzoyl peroxide (70%): 3.2 p.b.w.
(5) Aqueous calcium chloride solution (10% w./v.): 20 p.b.v.
 Polymerisation temperature: 85° C.

The product was produced as large beads having the following sieve analysis:

| Mesh No.: | Percent retained |
|---|---|
| 4 | 34.8 |
| 10 | 23.1 |
| 14 | 28.4 |
| 30 | 13.3 |
| 44 | 0.2 |
| 60 | 0.1 |
| 150 | 0.1 |
| 200 | Trace |
| >200 | Trace |

EXAMPLE 13

The process of Example 7 was repeated using the following ingredients:

(1) A polyvinyl chloride latex—solids content 33.2%—emulsifying agent, ammonium stearate: 226 p.b.w.
(2) Distilled water: 292 p.b.w.
(3) A 1% aqueous solution of a medium viscosity, 88% hydrolysed polyvinyl acetate: 150 p.b.v.
(4) Styrene: 146 p.b.w.
 Acrylonitrile: 79 p.b.w.
 Benzoyl peroxide (70%): 3.2 p.b.w.
(5) Aqueous acetic acid (10% w./v.): 7.1 p.b.v.
 Polymerisation temperature: 80° C.

The product was obtained as large sized beads having the following sieve analysis:

| Mesh No.: | Percent retained |
|---|---|
| 4 | 62.3 |
| 10 | 12.5 |
| 14 | 4.9 |
| 30 | 14.5 |
| 44 | 3.5 |
| 60 | 0.7 |
| 150 | 0.7 |
| 200 | 0.8 |
| >200 | Trace |

EXAMPLE 14

The process of Example 7 was repeated using the following ingredients:

(1) Styrene/acrylonitrile copolymer latex—solids content, 25.6%—emulsifying agent, sodium lauryl sulphate: 226 p.b.w.
(2) Distilled water: 367 p.b.w.
(3) 4% aqueous solution of hydroxy ethyl cellulose: 75 p.b.v.
(4) Methyl methacrylate: 225 p.b.w.
 Benzoyl peroxide (70%): 3.2 p.b.w.
(5) Aqueous acetic acid (10% w./v.): 7.1 p.b.v.
 Polymerisation temperature: 80° C.

The product was mainly produced as large sized beads although some hard crusted material was present in the reactor. The sieve analysis of the beads was as follows:

| Mesh No.: | Percent retained |
|---|---|
| 4 | 27.2 |
| 10 | 37.1 |
| 14 | 25.7 |
| 30 | 9.7 |
| 44 | 0.1 |
| 60 | 0.1 |
| 150 | Trace |

What is claimed is:

1. A process for the preparation of a polymer composition which comprises mixing an addition polymeric material of an ethylenically unsaturated monomer having a glass transition temperature above 20° C. in the form of an aqueous latex stabilized by means of a destructible ionic emulsifying agent with a monomeric material selected from the group consisting of a mono-ethylenically unsaturated aromatic compound, a lower alkyl ($C_1$ to $C_6$) ester of an unsaturated acid, a vinyl ester of a saturated lower organic acid ($C_1$ to $C_6$), acrylonitrile or methacrylonitrile, and in which the polymeric material does not dissolve, converting the emulsifying agent to a form ineffective as an emulsifying agent without substantially altering the size of the first polymeric material particles, allowing these particles to pass into the monomeric phase and polymerizing the monomeric material with said polymeric particles dispersed therein by mass polymerization techniques or in an aqueous system.

2. A process as claimed in claim 1, wherein the polymeric material is a polymer or copolymer of ethylene, propylene, styrene, methyl methacrylate, vinyl acetate or vinyl chloride.

3. A process as claimed in claim 1, wherein the destructible emulsifying agent is a carboxylic acid salt which is not an emulsifying agent in the free acid form.

4. A process as claimed in claim 1, wherein the monomeric material is styrene, vinyl acetate or methyl methacrylate.

5. A process as claimed in claim 1, wherein the monomeric material is polymerised under suspension polymerisation conditions in the presence of the aqueous phase of the first polymeric material latex.

(References on following page)

References Cited

UNITED STATES PATENTS

| | | | |
|---|---|---|---|
| 3,019,208 | 1/1962 | Reid et al. | 260—45.5 |
| 3,249,569 | 5/1966 | Fantl | 260—29.6 |
| 3,424,706 | 1/1969 | Smith et al. | 260—29.6 |
| 3,522,036 | 7/1970 | Vest et al. | 260—29.6 |

WILLIAM H. SHORT, Primary Examiner

E. A. NIELSEN, Assistant Examiner

U.S. Cl. X.R.

260—23 EM, 23.7 R, 23.7 N, 23.7 H, 29.6 RB, 29.7 UP, 878, 879, 880, 881, 884, 885